(12) United States Patent
Karaoguz et al.

(10) Patent No.: US 8,867,479 B2
(45) Date of Patent: Oct. 21, 2014

(54) MULTI-DIMENSIONAL NETWORK RESOURCE ALLOCATION

(75) Inventors: Jeyhan Karaoguz, Irvine, CA (US); Nambirajan Seshadri, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 368 days.

(21) Appl. No.: 13/275,584

(22) Filed: Oct. 18, 2011

(65) Prior Publication Data

US 2012/0033644 A1    Feb. 9, 2012

Related U.S. Application Data

(63) Continuation of application No. 11/092,955, filed on Mar. 29, 2005, now Pat. No. 8,040,788.

(60) Provisional application No. 60/601,456, filed on Aug. 13, 2004.

(51) Int. Cl.
  *H04W 4/00*     (2009.01)
  *H04W 16/14*    (2009.01)
  *H04W 72/04*    (2009.01)

(52) U.S. Cl.
  CPC .......... *H04W 16/14* (2013.01); *H04W 72/0453* (2013.01); *H04W 72/0446* (2013.01)
  USPC ...................................... 370/330; 455/452.2

(58) Field of Classification Search
  None
  See application file for complete search history.

(56) References Cited

U.S. PATENT DOCUMENTS

| | | | |
|---|---|---|---|
| 6,654,357 B1 * | 11/2003 | Wiedeman | 370/315 |
| 6,980,833 B1 * | 12/2005 | Hiramatsu | 455/562.1 |
| 8,040,788 B2 * | 10/2011 | Karaoguz et al. | 370/208 |
| 2002/0132600 A1 | 9/2002 | Rudrapatna | |
| 2003/0032453 A1 * | 2/2003 | Katz et al. | 455/562 |
| 2003/0072254 A1 | 4/2003 | Ma et al. | |
| 2003/0087673 A1 * | 5/2003 | Walton et al. | 455/562 |

(Continued)

FOREIGN PATENT DOCUMENTS

| | | | |
|---|---|---|---|
| CN | 1215514 | | 4/1999 |
| WO | WO0030276 | * | 5/2000 |

OTHER PUBLICATIONS

European Search Report corresponding to European Patent Application No. 05011258.0-1249, dated Sep. 1, 2010.

(Continued)

*Primary Examiner* — Mohammad Adhami
(74) *Attorney, Agent, or Firm* — Brinks Gilson & Lione

(57) ABSTRACT

A method for allocating communication resources for communication includes, in a first communication system including a plurality of transmitters, allocating frequency and time bandwidth for communication with a second communication system; determining a first portion of the plurality of transmitters for communication with the second communication system based, at least in part, on information obtained from the second communication system; and allocating the first portion of the plurality of transmitters for communication with the second communication system utilizing the allocated frequency and time bandwidth. A second portion of the plurality of transmitters may be allocated for a purpose other than communication with the second communication system utilizing the allocated frequency and time bandwidth. The allocating of the second portion of the plurality of transmitters includes allocating the second portion of the plurality of transmitters for communication with a third communication system utilizing the allocated frequency and time bandwidth.

28 Claims, 4 Drawing Sheets

(56) References Cited

U.S. PATENT DOCUMENTS

| | | |
|---|---|---|
| 2003/0109217 A1* | 6/2003 | Reed et al. .................. 455/3.05 |
| 2003/0128658 A1 | 7/2003 | Walton et al. |
| 2004/0009755 A1 | 1/2004 | Yoshida |
| 2004/0087275 A1 | 5/2004 | Sugar et al. |
| 2005/0101259 A1 | 5/2005 | Tong et al. |
| 2005/0152314 A1* | 7/2005 | Sun et al. ..................... 370/334 |
| 2005/0179607 A1 | 8/2005 | Gorsuch et al. |
| 2005/0287962 A1 | 12/2005 | Mehta et al. |
| 2006/0146867 A1* | 7/2006 | Lee et al. ..................... 370/465 |
| 2012/0027124 A1* | 2/2012 | Murakami et al. ............ 375/295 |

OTHER PUBLICATIONS

IEEE 100 The Authoritative Dictionary of IEEE Standards Terms, 2000, 7th edition, p. 1051.

* cited by examiner

MULTI-DIMENSIONAL NETWORK RESOURCE ALLOCATION

CROSS-REFERENCE TO RELATED APPLICATIONS/INCORPORATION BY REFERENCE

This patent application is a continuation of U.S. patent application Ser. No. 11/092,955, filed Mar. 29, 2005, now U.S. Pat. No. 8,040,788 which claims benefit from and priority to provisional patent application Ser. No. 60/601,456 filed on Aug. 13, 2004, the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Various communication systems may utilize single transmission path communications or multiple transmission path communications (e.g., Multiple Input Multiple Output "MIMO" communications). In such systems, a system resource manager may allocate frequency and time bandwidth for various communications. Such frequency and time bandwidth may, for example, comprise characteristics of frequency allocation, time allocation, code allocation, hopping sequence allocation, or any combination thereof.

Various communication systems may also comprise and utilize multiple antennas for communication. For example MIMO communication systems may utilize a plurality of spatially displaced antennas for communication between systems. MIMO communication systems utilize spatial diversity provided by multiple antennas and favorable multipath conditions to improve communication between systems.

However, present communication systems fail to utilize the spatial diversity of multi-antenna communication systems to efficiently allocate and utilize limited bandwidth resources. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for allocating communication resources in a multi-transceiver communication system, where multiple transmitters transmit respective signals to a generally similar area, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
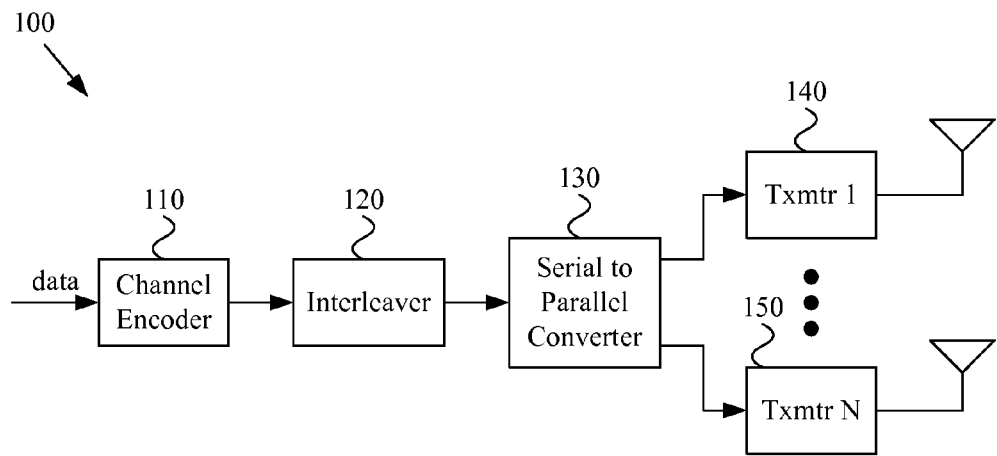
FIG. 1 is a diagram illustrating an exemplary MIMO transmitting configuration.
Figure 2:
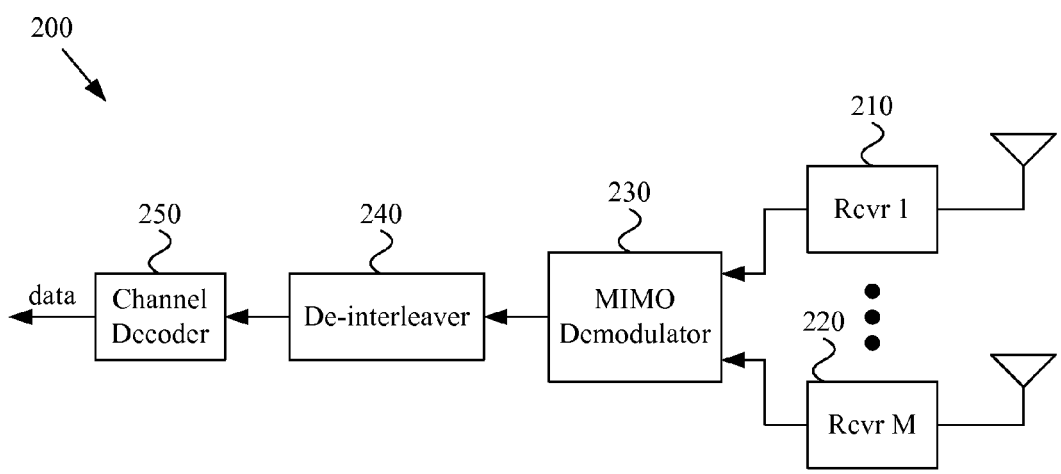
FIG. 2 is a diagram illustrating an exemplary MIMO receiving configuration.

The following discussion may illustrate various aspects of the present invention by referring to communication systems having Multiple-Input-Multiple-Output ("MIMO") communication capability. FIGS. 1 and 2 illustrate basic MIMO transmitting and receiving configurations, respectively. Note, however, that the scope of various aspects of the present invention should not be limited by characteristics of particular MIMO system configurations.

FIG. 1 is a diagram illustrating an exemplary communication system 100 having a Multiple-Input-Multiple-Output ("MIMO") transmitting configuration. The channel encoder 110 receives data. The data may comprise any of a variety of data types, including but not limited to, audio data, video data, textual data, graphical data, pictorial data, etc. The channel encoder 110 may comprise any of a variety of encoder types. For example and without limitation, the channel encoder 110 may comprise characteristics of a conventional encoder, error correction encoder, MIMO encoder, etc.

The exemplary system 100 may comprise an interleaver 120 that receives the encoded data from the channel encoder 110. The interleaver 120 may, for example, perform interleaving to spread errors. The exemplary system 100 may comprise a serial-to-parallel converter 130 that divides the single data stream out of the interleaver 120 (or channel encoder 110) into a plurality of (e.g., up to N) parallel paths. The outputs of the serial-to-parallel converter 130 may be coupled to a plurality of transmitters (e.g., transmitter 140 through transmitter 150) and respective antennas for transmission.

FIG. 2 is a diagram illustrating an exemplary communication system 200 having an exemplary MIMO receiving configuration. A plurality of transmitted signals may arrive at the plurality of (e.g., up to M) antennas and respective receivers (e.g., receiver 210 through receiver 220). The receivers 210-220 may provide the simultaneously received signals to a MIMO demodulator 230. The MIMO demodulator 230 may provide a serial stream of information to a de-interleaver 240 and to a channel decoder 250 to convert the received signals into output data.

Note that the exemplary MIMO systems illustrated in FIGS. 1 and 2 are merely illustrative examples of basic MIMO systems. It should be noted that a MIMO system may comprise many various alternative configurations. Further, it should be noted that many characteristics of MIMO systems are shared with MISO systems.

Figure 3:
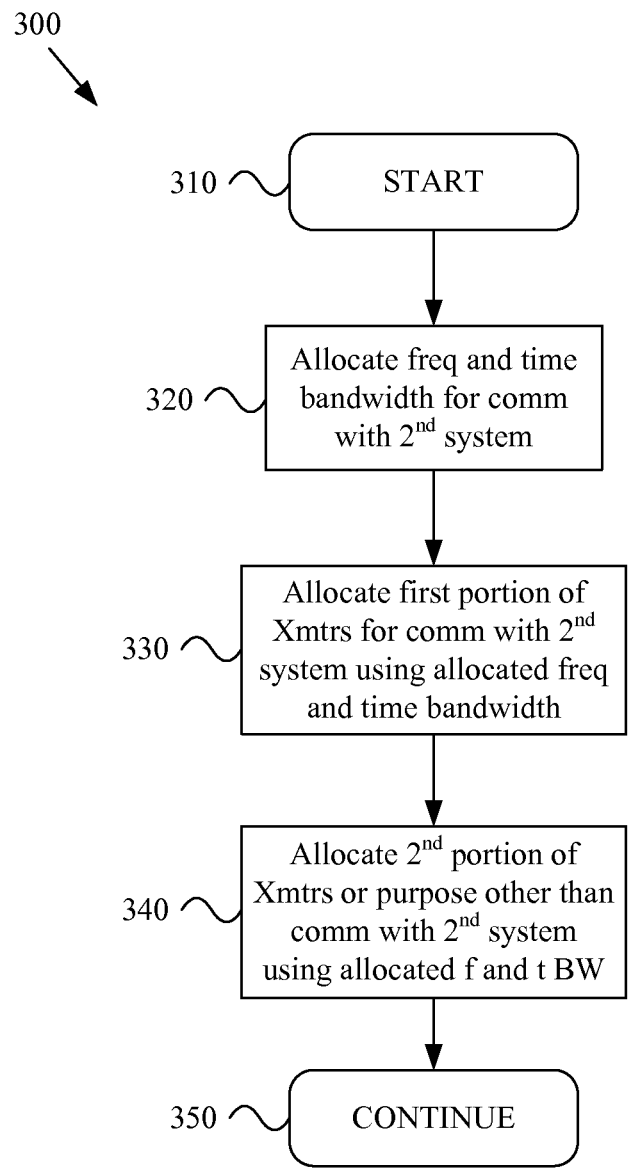
FIG. 3 is a flow diagram illustrating an exemplary method for allocating communication resources, in accordance with various aspects of the present invention.

FIG. 3 is a flow diagram illustrating an exemplary method 300 for allocating communication resources, in accordance with various aspects of the present invention. The exemplary method 300 may, for example, be implemented by any of a variety of communication systems that utilize a plurality of transmitters to transmit signals to a generally similar area (e.g., a same communication cell or general coverage area). Such communication systems may, for example, comprise a plurality of antennas and/or antenna elements that correspond to the plurality of transmitters. For example and without limitation, the method 300, or portions thereof, may be implemented by various modules or systems of a MIMO communication network (e.g., a base station, access point, or central controller). Also for example, the method 300 may be implemented by a fixed or portable MIMO communication system that communicates with a MIMO communication network. Accordingly, the scope of various aspects of the present invention should not be limited by characteristics of a particular communication system that may implement the exemplary method 300.

The exemplary method 300 may begin executing at step 310. The exemplary method 300 (and other methods discussed herein, for example, exemplary method 400) may begin executing for any of a variety of reasons. For example and without limitation, the exemplary method 300 may begin in response to a user or automated input initiating a communication. Also for example, the exemplary method 300 may begin in response to a message arriving from another communication system. Further for example, the exemplary method 300 may begin in response to one or more detected or determined communication environment conditions. Still further for example, the exemplary method 300 may begin in response to timer expiration. Accordingly, the scope of various aspects of the present invention should not be limited by characteristics of any particular initiating cause or condition.

The exemplary method 300 may, at step 320, comprise allocating frequency and time bandwidth for communication with a second communication system (i.e., at least a second communication system). Frequency and time bandwidth may also be referred to herein as frequency-time space.

Frequency and time bandwidth may comprise characteristics corresponding to various communication types or protocols. For example and without limitation, in a communication system comprising Frequency Division Multiplexing ("FDM") characteristics, frequency and time bandwidth may correspond to a particular frequency for a known or indefinite time period. Additionally for example, in a communication system comprising Time Division Multiplexing ("TDM") characteristics, frequency and time bandwidth may correspond to a particular timeslot at any (or all) frequencies. Also for example, in a communication system comprising Time Division Multiple Access ("TDMA") characteristics, frequency and time bandwidth may correspond to a particular timeslot at a particular frequency. Further for example, in a communication system comprising Code Division Multiple Access ("CDMA") characteristics, frequency and time bandwidth may correspond to utilization of a particular code for a known or indefinite time period. Still further for example, in a communication system comprising frequency-hopping characteristics, a frequency and time bandwidth may correspond to a particular hopping sequence. Also for example, in a communication system comprising characteristics of a system utilizing transmission at known and irregular time intervals, a frequency and time bandwidth may correspond to a particular signal transmission timing sequence at any (or all) frequencies. Accordingly, the scope of various aspects of the present invention should not be limited by characteristics of any particular manner of allocating frequency and time bandwidth.

Step 320 may comprise allocating frequency and time bandwidth (or frequency-time space) for communication with a second communication system in any of a variety of manners. For example and without limitation, step 320 may comprise determining communication bandwidth needed for a communication and determining a particular frequency and time bandwidth that may (e.g., in combination with antenna multiplexing) provide an appropriate level of communication bandwidth for the communication.

Step 320 may, for example, comprise allocating frequency and time bandwidth for one or more communications by cross-listing a communication (or multiple communications) with frequency-time space in a data table. Also for example, such allocating may be performed utilizing various arrays or lists with allocation flags. Accordingly, the scope of various aspects of the present invention should not be limited by characteristics of any particular manner of allocating or managing frequency-time space.

The exemplary method 300 may, at step 330, comprise allocating a first portion of the plurality of transmitters for communication with the second communication system utilizing the allocated frequency and time bandwidth. Step 330 may comprise allocating the first portion of the plurality of transmitters in any of a variety of manners.

Step 330 may, for example and without limitation, comprise maintaining a cross-list of transmitters to respective communications. Also for example, step 330 may comprise maintaining allocation flags, arrays and/or tables. Step 330 may also, for example, comprise communicating or preparing communication support information (e.g., protocol information, secure communication information, MIMO training information, etc.). Step 330 may also, for example, comprise specifying or controlling the routing of communication signals between various communication support modules and transmitters of the communication system. Accordingly, the scope of various aspects of the present invention should not be limited by characteristics of any particular manner of allocating one or more transmitters (or related components) for communicating with another communication system.

Step 330 may also, for example, comprise determining the first portion of the plurality of transmitters to be allocated for communication with the second communication system. Step 330 may perform such determination in any of a variety of manners.

For example and without limitation, step 330 may comprise determining the first portion of the plurality of transmitters based, at least in part, on communication quality. In a non-limiting exemplary scenario, step 330 may comprise determining (e.g., analytically or empirically) communication quality associated with utilizing the plurality of transmitters to communicate with the second communication system. Step 330 may then comprise determining whether the quality corresponding to the first portion of the plurality of transmitters is appropriate for communicating with the second communication system. Step 330 may, for example, comprise making such a determination based, at least in part, on predetermined quality goals or quality goals that may be communicated with the second communication system.

Also for example, step 330 may comprise determining the first portion of the plurality of transmitters based, at least in part, on energy or power considerations. In a non-limiting exemplary scenario, step 330 may comprise determining (e.g., analytically or empirically) an amount of energy (or power) associated with utilizing the first portion of the plurality of transmitters for communicating with the second communication system. Step 330 may, for example, comprise determining energy associated with transmission power and/or signal processing. Step 330 may also, for example, comprise determining energy associated with the communication system and/or the second communication system. Additionally, step 330 may, for example, comprise determining energy (or power) availability for the communication system and/or the second communication system (e.g., relatively limited battery energy and/or relatively unlimited electric utility energy).

After determining information of one or more energy or power considerations, step 330 may then comprise determining whether the energy associated with utilizing the first portion of the plurality of transmitters is appropriate for communicating with the second communication system. In a first non-limiting exemplary scenario, step 330 may comprise determining that the energy associated with utilizing the first portion of the plurality of transmitters is appropriate. In a second non-limiting exemplary scenario, step 330 may comprise determining that the energy associated with utilizing the first portion of the plurality of transmitters is too high and that a different portion of the plurality of transmitters should be utilized.

Step 330 may also, for example, comprise determining the first portion of the plurality of transmitters based, at least in part, on physical location of the second communication system. Step 330 may, for example, comprise determining the physical location of the second communication system by utilizing any of a variety of techniques (e.g., GPS or system triangulation) or by receiving information of such location from the second communication system.

Once such physical location of the second communication system has been determined, step 330 may comprise determining the first portion of the plurality of transmitters based, at least in part, on such physical location. For example and without limitation, step 330 may comprise comparing the physical location to a predetermined map that cross-lists physical locations to respective sets or numbers of transmitters.

Step 330 may also, for example, comprise determining the first portion of the plurality of transmitters based, at least in part, on multi-path characteristics of the present communication environment. For example, step 330 may comprise determining multipath characteristics between the communication system and the second communication system analytically or empirically. In a first non-limiting exemplary scenario, step 330 may comprise determining multipath characteristics by comparing a determined physical location of the second communication system with a map of multipath characteristics. In a second non-limiting exemplary scenario, step 330 may comprise communicating a test signal with the second communication system and measuring multipath characteristics.

Once multipath characteristics have been determined, step 330 may comprise determining the first portion of the plurality of transmitters based, at least in part, on such multi-path characteristics. For example, in a first non-limiting exemplary scenario, step 330 may comprise determining that the multipath characteristics correspond to relatively efficient utilization of a relatively high number of the plurality of transmitters for communication with the second communication system. Also for example, in a second non-limiting exemplary scenario, step 330 may comprise determining that the multipath characteristics correspond to relatively efficient utilization of a single or low number of the plurality of transmitters for communication with the second communication system.

Step 330 may further, for example, comprise determining the first portion of the plurality of transmitters based, at least in part, on information obtained from the second communication system. Such information may comprise characteristics of any of a variety of information. As mentioned previously, such information may comprise information of quality goals and/or location information. Also, for example, such information may comprise information of communication capabilities of the second communication system (e.g., total number or functional number of transceivers, MIMO or MISO communication capability, etc.).

Step 330 may comprise obtaining such information from the second communication system in real-time as needed or prior to the need for such information. For example, step 330 may comprise processing information previously obtained from the second communication system and stored in a memory. Alternatively, step 330 may comprise communicating with the second communication system to obtain information from the second communication system as such information is needed. Once such information has been obtained from the second communication system, step 330 may comprise determining the first portion of the plurality of transmitters based, at least in part, on such information.

Step 330 may still further, for example, comprise determining the first portion of the plurality of transmitters based, at least in part, on user command. Step 330 may comprise making such a determination in any of a variety of manners. For example and without limitation, step 330 may comprise communicating (e.g., through a user interface of the communication system) with a user of the communication system to receive a user command regarding a number of the plurality of transmitters or a particular set of the plurality of transmitters to utilize. Similarly for example, step 330 may comprise communicating with a user of the second communication system. Note that such a user command may directly specify the first portion of the plurality of transmitters or may specify other related aspects of communication system operation that are related to the plurality of transmitters (e.g., communication quality or energy-related user commands).

Step 330 may also, for example, comprise determining the first portion of the plurality of transmitters based, at least in part, on a predetermined first portion. Such a predetermined first portion may, for example, be mandated or may represent a default first portion to utilize. Such a predetermined first portion may, for example, be associated with a particular communication system, second communication system, group of communication systems, etc. Such a predetermined first portion may, for example, be based on prior communications with the second communication system or other communication system(s).

Step 330 may further, for example, comprise determining the first portion of the plurality of transmitters based, at least in part, on system or communication priority. In a first non-limiting exemplary scenario, step 330 may comprise determining to allocate up to a relatively high number of the plurality of transmitters for communication with a relatively high-priority second communication system (e.g., associated with a relatively high-cost communication plan or associated with an emergency communication). In a second non-limiting exemplary scenario, step 330 may comprise determining to allocate only a relatively low number of the plurality of transmitters for communication with a relatively low-priority second communication system (e.g., associated with a relatively low-cost communication plan).

Step 330 may additionally, for example, comprise determining the first portion of the plurality of transmitters based, at least in part, on time information (e.g., time-of-day, day-of-week, date, type-of-day, etc.). In a first non-limiting exemplary scenario, step 330 may comprise determining to allocate a relatively small first portion of the plurality of transmitters during particular hours of the day and to allocate a relatively large first portion of the plurality of transmitters during other particular hours of the day. In a second non-limiting exemplary scenario, step 330 may comprise determining to allocate one portion of the plurality of transmitters during the workweek and another portion of the plurality of transmitters on the weekend (or on holidays).

In general, step 330 may comprise allocating a first portion of the plurality of transmitters for communication with the second communication system utilizing the allocated frequency and time bandwidth (e.g., as allocated at step 320). Accordingly, the scope of various aspects of the present invention should not be limited by characteristics of any particular manner of performing such allocation or any particular manner of determining such a first portion of the plurality of transmitters.

The exemplary method 300 may, at step 340, comprise allocating a second portion of the plurality of transmitters for a purpose other than utilizing the allocated frequency and time bandwidth (e.g., as allocated at step 320) to communicate with the second communication system. Step 340 may, for example and without limitation, share various characteristics with exemplary step 330.

Step 340 may comprise allocating a second portion of the plurality of transmitters in any of a variety of manners. In a first non-limiting exemplary scenario, step 340 may comprise blocking the second portion of the plurality of transmitters from utilizing the allocated frequency and time bandwidth to communicate with any communication system.

In a second non-limiting exemplary scenario, step 340 may comprise allocating the second portion of the plurality of transceivers for communication with a third communication system utilizing the allocated frequency and time bandwidth. In such an exemplary scenario, step 340 may also comprise determining the second portion of the plurality of transmitters (e.g., in any manner discussed previously with regard to the first portion determined at exemplary step 330). For example and without limitation, in such an exemplary scenario, the second communication system and the third communication system may each comprise a number of receivers not less than the combined number of the first portion of the plurality of transmitters and the second portion of the plurality of transmitters.

As with exemplary step 330, step 340 may, for example and without limitation, comprise maintaining a cross-list of transmitters (or corresponding communication resources) to respective communications (e.g., the same cross-list that step 330 may maintain). Also for example, step 340 may comprise maintaining allocation flags, arrays and/or tables. In scenarios where the second portion of the plurality of transmitters may be utilized to communicate with a third communication system, step 340 may also, for example, comprise communicating or preparing communication support information (e.g., protocol information, secure communication information, MIMO training information, etc.). In such scenarios, step 340 may also, for example, comprise specifying or controlling the routing of communication signals between various communication support modules and transmitters of the communication system.

In general, step 340 may comprise allocating a second portion of the plurality of transmitters for a purpose other than utilizing the allocated frequency and time bandwidth (e.g., as allocated at step 320) to communicate with the second communication system. Accordingly, the scope of various aspects of the present invention should not be limited by characteristics of any particular manner of blocking or allocating one or more transmitters for communicating with another communication system.

The exemplary method 300 may, at step 350, comprise performing continued processing. Various steps of exemplary method 400, to be discussed later, may also perform such continued processing. Such continued processing may comprise characteristics of any of a large variety of continued processing. For example and without limitation, step 350 may comprise communicating with the second communication system utilizing the first portion of the plurality of transmitters allocated for such communication at step 330 and the frequency-time space allocated at step 320. Also for example, step 350 may, in various exemplary scenarios, comprise communicating with a third communication system utilizing the second portion of the plurality of transmitters, as may have been allocated at step 340, and the frequency-time space allocated at step 320. Additionally for example, step 350 may comprise communicating with additional communication systems (e.g., utilizing transmitters not allocated at steps 330 and 340) utilizing the frequency-time space allocated at step 320.

Step 350 may also, for example and without limitation, comprise performing user interface functions. Step 350 may additionally, for example, comprise monitoring communication quality and/or communication conditions associated with various communications. Step 350 may further, for example, comprise waiting for additional communication to be requested. Also for example, step 350 may comprise looping execution of the exemplary method 300 back up to step 320 for re-determination of frequency-time space allocation and/or transmitter allocation (e.g., to communicate additional communications, or portions thereof, or in response to detected communication conditions). Accordingly, the scope of various aspects of the present invention should not be limited by particular types of continued processing that may be performed by a system implementing the exemplary method 300.

The exemplary method 300 was presented to provide specific illustrations of generally broader aspects of the present invention. Accordingly, the scope of various aspects of the present invention should not be limited by specific characteristics of the exemplary method 300. For example, the exemplary method 300 was presented by generally discussing transmitter allocation. Various aspects of the present invention are readily extensible to receiver, transceiver or antenna allocation. Also, various aspects of the present invention are readily extensible to the allocation of various signal processing components (e.g., encoders/decoders, mappers, interleavers, etc.), hardware and/or software, of a communication system that generally correspond to communication utilizing multiple antennas.

Figure 4:
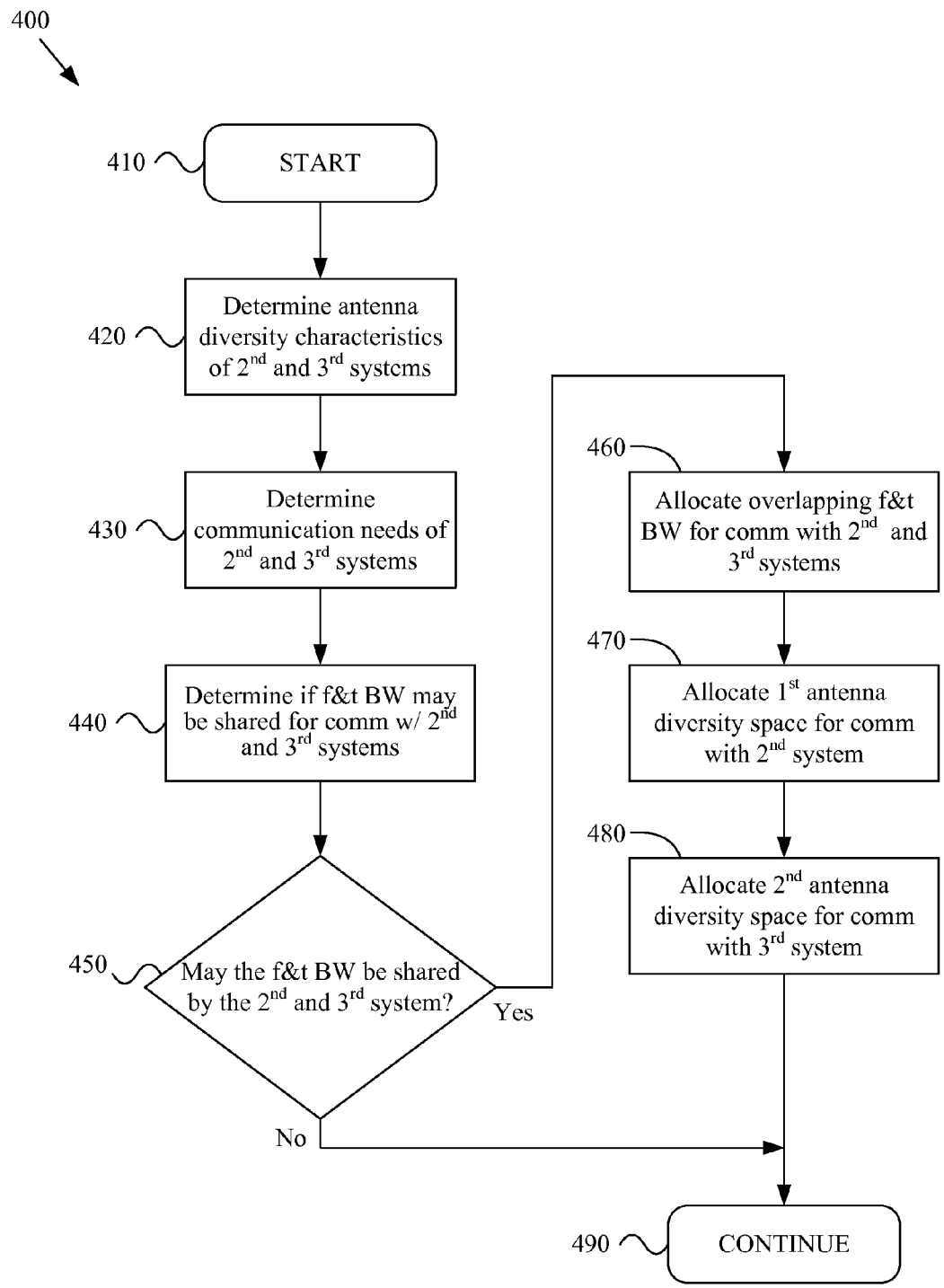
FIG. 4 is a flow diagram illustrating an exemplary method for allocating communication resources, in accordance with various aspects of the present invention.

FIG. 4 is a flow diagram illustrating an exemplary method 400 for allocating communication resources, in accordance with various aspects of the present invention. The exemplary method 400 may, for example and without limitation, share various characteristics with the exemplary method 300 illustrated in FIG. 3 and discussed previously. The exemplary method 400 may, for example in a first communication system comprising a plurality of antennas, comprise allocating communication resources for communication with a second communication system and a third communication system. The plurality of antennas may, for example, communicate signals to a generally similar area (e.g., a same communication cell or general coverage area).

The exemplary method 400 may, for example, be implemented by any of a variety of communication systems that utilize a plurality of antennas to transmit signals to a generally similar area. Such communication systems may, for example, comprise a plurality of receivers, transmitters, transceivers, and a variety of signal processing modules or components that correspond to the plurality of antennas. For example and without limitation, the method 400, or portions thereof, may be implemented by various modules or systems of a MIMO communication network (e.g., a base station, access point, or central controller). Also for example, the method 400 may be implemented by a fixed or portable MIMO communication system that communicates with a MIMO communication network. Accordingly, the scope of various aspects of the present invention should not be limited by characteristics of a particular communication system that may implement the exemplary method 400.

The exemplary method 400 may, at step 420, comprise determining antenna diversity characteristics of the second and third communication systems. For example, step 420 may comprise determining the respective number of antennas of the second and third communication systems. Also for example, step 420 may comprise determining respective capabilities (e.g., MIMO or MISO communication capabilities) of the second and third communication systems to utilize their respective antennas for communication.

Step 420 may comprise determining antenna diversity characteristics of the second and third communication systems in any of a variety of manners. For example and without limitation, step 420 may comprise determining such characteristics by accessing information stored in a memory (e.g., a memory of the communication system or a memory communicatively coupled to the communication system). Also, for example, step 420 may comprise determining such characteristics by communicating with the second and third communication systems (or other systems) regarding the antenna diversity characteristics. Further for example, step 420 may comprise determining such characteristics by communicating with one or more users of the various communication systems.

In general, step 420 may comprise determining antenna diversity characteristics of the second and third communication systems. Accordingly, the scope of various aspects of the present invention should not be limited by characteristics of any particular antenna diversity characteristics or of any particular manner of determining such characteristics.

The exemplary method 400 may, at step 430, comprise determining communication needs (or goals) of the second and third communication systems. The communication needs may comprise characteristics of any of a variety of communication needs. For example and without limitation, such communication needs may comprise communication quality needs (e.g., quality targets, minimum acceptable quality needs, minimum data throughput requirements, error rate goals, etc.). Also for example, such communication needs may comprise communication energy or power needs (e.g., energy consumption goals, maximum acceptable energy utilization, energy utilization statistics, amount of available energy, etc.).

Step 430 may comprise determining the communication needs of the second and third communication systems in any of a variety of manners. For example and without limitation, step 430 may comprise determining the respective communication needs of the second and third communication systems by communicating with the second and third communication systems, or users thereof. Also for example, step 430 may comprise determining the respective communication needs of the second and third communication systems by accessing information stored in a memory (e.g., a memory of the communication system or a memory communicatively coupled thereto). Further for example, step 430 may comprise communicating with one or more users to determine communication quality needs. Still further for example, step 430 may comprise determining default communication quality needs.

In general, step 430 may comprise determining communication needs of the second and third communication systems. Accordingly, the scope of various aspects of the present invention should not be limited by characteristics of any particular communication need or of any particular manner of determining such communication needs.

The exemplary method 400 may, at step 440, comprise analyzing the antenna diversity characteristics (e.g., as determined at step 420) and the communication needs (e.g., as determined at step 430) to determine if frequency and time bandwidth may be shared for communication with the second and third communication systems. Step 440 may comprise performing such an analysis and making such a determination in any of a variety of manners.

For example and without limitation, step 440 may comprise determining whether various antenna allocations of the communication system (e.g., compatible with the determined antenna diversity characteristics of the second and third communication systems), while utilizing the same frequency and time bandwidth, may provide communication with the second and third communication systems at acceptable quality levels. In a non-limiting exemplary scenario, step 440 may comprise analytically or empirically determining a communication quality associated with a particular allocation of antennas for communicating with the second communication system, and determining a communication quality associated with a particular allocation of antennas for communicating with the third communication system. Step 440 may then, for example, comprise comparing such determined qualities to communication quality goals (e.g., as determined at step 430) to determine whether the particular allocations of antennas would provide communication meeting desired quality goals. Step 440 may, for example, comprise performing such analysis for a variety of potential antenna allocations.

Also for example, step 440 may comprise determining whether various antenna allocations of the communication system (e.g., compatible with the determined antenna diversity characteristics of the second and third communication systems), while utilizing the same frequency and time bandwidth, may provide communication with the second and third communication systems with acceptable energy or power utilization. In a non-limiting exemplary scenario, step 440 may comprise analytically or empirically determining energy or power utilization associated with a particular allocation of antennas for communication with the second communication system, and determining energy or power utilization associated with a particular allocation of antennas for communication with the third communication system. Step 440 may then, for example, comprise comparing such determined energy or power utilizations to communication energy goals (e.g., as determined at step 430) to determine whether the particular allocations of antennas would provide communication with acceptable energy or power utilization. Step 440 may, for example, comprise performing such analysis for a variety of potential antenna allocations.

In general, step 440 may comprise analyzing the antenna diversity characteristics (e.g., as determined at step 420) and the communication needs (e.g., as determined at step 430) to determine if frequency and time bandwidth may be shared for communication with the second and third communication systems. Accordingly, the scope of various aspects of the present invention should not be limited by aspects of any particular antenna diversity characteristics, allocations, or communication needs of various communication systems.

The exemplary method 400 may, at step 450, comprise controlling execution flow of the exemplary method 400. For example, if it was determined at step 440, that frequency and time bandwidth may be shared for communication with the second and third communication systems, then step 450 may direct execution flow of the exemplary method 400 to step 460. If however, it was determined at step 440, that frequency and time bandwidth may not be shared for communication with the second and third communication systems, then step 450 may direct execution flow of the exemplary method 400 to step 490.

The exemplary method 400 may, at step 460, comprise allocating overlapping frequency and time bandwidth for communications with the second and third communication systems. For example and without limitation, step 460 may share various characteristics with step 320 of the exemplary method 300 illustrated in FIG. 3 and discussed previously, albeit with respect to allocating frequency and time bandwidth for communication with second and third communication systems.

For example, frequency and time bandwidth may comprise characteristics corresponding to various communication types or protocols (e.g., FDM, TDM, TDMA, CDMA, frequency hopping sequencing, time interval hopping, etc.). Also for example, step 460 may comprise determining communication bandwidth needed for communications with the second and third communication systems and determining a particular frequency and time bandwidth that may (e.g., in combination with antenna multiplexing) provide an appropriate level of communication bandwidth for the communication.

Step 460 may, for example, comprise allocating frequency and time bandwidth for communication by cross-listing a communication (or multiple communications) with frequency-time space in a data table. Also for example, such allocating may be performed utilizing various arrays or lists with allocation flags. Accordingly, the scope of various aspects of the present invention should not be limited by characteristics of any particular manner of allocating or managing frequency-time space.

The exemplary method 400 may, at step 470, comprise allocating a first antenna diversity space for communication with the second communication system. Step 470 may, for example and without limitation, share various characteristics with step 330 of the exemplary method 300 illustrated in FIG. 3 and discussed previously.

Such a first antenna diversity space may, for example, comprise a first portion of the plurality of antennas of the communication system. Such a first antenna diversity space may, for example, comprise a first portion of various transmitters, receivers, transceivers, signal processing modules and other components corresponding to a first portion of the plurality of antennas of the communication system.

As discussed previously with regard to step 330 of exemplary method 300, step 470 may comprise performing the allocation in any of a variety of manners. Step 470 may, for example and without limitation, comprise maintaining a cross-list of various components related to antenna (or spatial) diversity (e.g., transmitters, receivers, transceivers, antennas, codecs, mappers, etc.) to respective communications. Also for example, step 470 may comprise maintaining allocation flags, arrays and/or tables. Step 470 may also, for example, comprise communicating or preparing communication support information (e.g., protocol information, secure communication information, MIMO training information, etc.) associated with communicating utilizing allocated antenna diversity space. Step 470 may, for example, comprise specifying or controlling the routing of communication signals between various communication support modules and transmitters of the communication system implementing the method 400. Accordingly, the scope of various aspects of the present invention should not be limited by characteristics of any particular manner of allocating antenna diversity space (or various components associated therewith) for communicating with other communication systems.

Step 470 may also, for example, comprise determining the first antenna diversity space and/or components associated therewith. Step 470 may comprise performing such determination in any of a variety of manners, exemplary illustrations of which were provided previously in the discussion regarding step 330 of the exemplary method 300 illustrated in FIG. 3. For example and without limitation, step 470 may comprise determining the first antenna diversity space and/or components associated therewith based, at least in part, on any of communication quality, various energy considerations, power considerations, communication system location(s), multipath characteristics, various information obtained from the second and third communication systems, various information stored in memory of the communication system, user command, predetermined antenna diversity space, system priority, time information, etc.

Note that in allocating the first antenna diversity space for communication with the second communication system (e.g., in determining the characteristics of the first antenna diversity space or associated system components) step 470 may, of course, comprise performing such allocations in light of the antenna diversity characteristics determined at step 420 and the communication needs determined at step 430. For example, the first antenna diversity space may be determined to correspond to the antenna diversity characteristics of the second communication system (e.g., as determined at step 420) and determined to meet communication needs of the second communication system (e.g., as determined at step 430).

In general, step 470 may comprise allocating a first antenna diversity space for communication with the second communication system. Accordingly, the scope of various aspects of the present invention should not be limited by characteristics of any particular manner of performing such allocation or any particular manner of determining such a first antenna diversity space or associated components.

The exemplary method 400 may, at step 480, comprise allocating a second antenna diversity space for communication with the third communication system. Step 480 may, for example and without limitation, share various characteristics with step 470, albeit with respect to the third communication system instead of the second communication system. Also, for example and without limitation, step 480 may share various characteristics with step 340 of the exemplary method 300 illustrated in FIG. 3 and discussed previously.

Such a second antenna diversity space may, for example, comprise a second portion of the plurality of antennas of the communication system. Such a second antenna diversity space may, for example, comprise a second portion of various transmitters, receivers, transceivers, signal processing modules and other components corresponding to a second portion of the plurality of antennas of the communication system.

In general, step 480 may comprise allocating a second antenna diversity space for communication with the third communication system. Accordingly, the scope of various aspects of the present invention should not be limited by characteristics of any particular manner of performing such allocation or any particular manner of determining such a second antenna diversity space or associated components.

The exemplary method 400 may, at step 490, comprise performing continued processing. Step 490 may, for example and without limitation, share various characteristics with step 350 of the exemplary method 300 illustrated in FIG. 3 and discussed previously. Such continued processing may comprise characteristics of any of a large variety of continued processing. For example and without limitation, step 490 might comprise communicating with the second and third communication systems utilizing the first and second allocated antenna diversity spaces allocated at steps 470 and 480. Additionally for example, step 490 may comprise communicating with additional communication systems (e.g., utilizing antenna diversity space not allocated at steps 470 and 480) utilizing the frequency and time space allocated at step 460.

Step 490 may also, for example and without limitation, comprise performing user interface functions. Step 490 may additionally, for example, comprise monitoring communication quality and/or communication conditions associated with the second and third communication systems. Step 490 may further, for example, comprise waiting for additional communication to be requested. Also for example, step 490 may comprise looping execution of the method 400 back up to step 420 for re-determination of diversity characteristics, communication needs, frequency-time space allocation and/or antenna diversity allocation (e.g., to communicate additional communications, or portions thereof, or in response to detected communication conditions). Accordingly, the scope of various aspects of the present invention should not be limited by particular types of continued processing that may be performed by a system implementing the exemplary method 400.

The exemplary method 400 was presented to provide specific illustrations of generally broader aspects of the present invention. Accordingly, the scope of various aspects of the present invention should not be limited by specific characteristics of the exemplary method 400. For example, the exemplary method 400 was presented by generally discussing antenna diversity space allocation. Various aspects of the present invention may, for example, comprise transmitter, receiver, transceiver or antenna allocation. Also for example, various aspects of the present invention may comprise allocation of various signal processing components (e.g., encoders/decoders, mappers, interleavers, etc.), hardware and/or software, of a communication system that generally correspond to communication utilizing multiple antennas and antenna diversity space.

Figure 5:
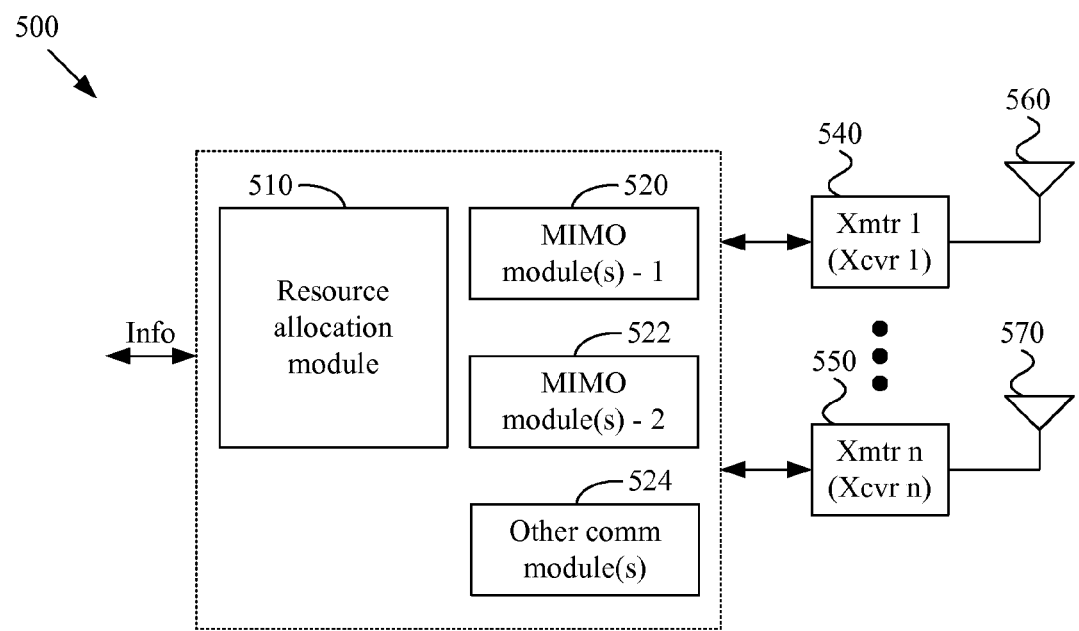
FIG. 5 is a diagram illustrating an exemplary system for allocating communication resources, in accordance with various aspects of the present invention.

FIG. 5 is a diagram illustrating an exemplary system 500 for allocating network resources, in accordance with various aspects of the present invention. The exemplary system 500 may, for example and without limitation, share various functional characteristics with the exemplary methods 300, 400 illustrated in FIGS. 3-4 and discussed previously. Also for example, the exemplary system 500 may share various characteristics with the exemplary MIMO systems 100, 200 illustrated in FIGS. 1-2 and discussed previously.

The exemplary system 500 may correspond to, or be integrated with, any of a variety of communication systems comprising a plurality of antennas that transmit respective signals to a generally similar area (e.g., a same communication cell or general coverage area). Such communication systems may, for example, comprise a plurality of transmitters, receivers or transceivers that correspond to the plurality of antennas. For example and without limitation, the exemplary system 500, or portions thereof, may be implemented by various modules or systems of a MIMO communication network (e.g., a base station, access point, or central controller). Also for example, the exemplary system 500 may be implemented by various modules or systems of a fixed or portable MIMO communication system that communicates with a MIMO communication network. Accordingly, the scope of various aspects of the present invention should not be limited by characteristics of a particular communication system, or portions thereof, that may implement aspects of the exemplary system 500.

The exemplary system 500 may comprise a resource allocation module 510 and a plurality of MIMO modules (e.g., a first MIMO module 520 and a second MIMO module 522). The exemplary system 500 may further comprise a plurality of transmitters (e.g., a first transmitter 540 through $n^{th}$ transmitter 550), which may, for example, represent portions of respective transceivers. The exemplary system 500 may also comprise antennas (e.g., a first antenna 560 through $n^{th}$ antenna 570), which may generally correspond to the plurality of transmitters. Additionally, the exemplary system 500 may comprise other communication modules 524 (e.g., standard or non-MIMO communication modules).

Various aspects of the exemplary system 500 will be illustrated with MIMO modules, components or subsystems. However, the scope of various aspects of the present invention should not be limited by characteristics of MIMO communication systems or components thereof. Additionally, various aspects of the exemplary system 500 will be illustrated by discussing the allocation of transmitter resources. It should be recognized that transmitter allocation is discussed for the sake of clarity, and the scope of various aspects of the present invention is readily extensible to other communication resources (e.g., transceivers, receivers, antennas, codecs, various MIMO communication resources, etc.). Therefore, the scope of various aspects of the present invention should not be limited to the allocation of transmitters.

The plurality of MIMO modules (e.g., the first MIMO module 520 and the second MIMO module 522) may generally correspond to any of a variety of MIMO communication resources. For example and without limitation, the plurality of MIMO modules may share various characteristics or components with the exemplary MIMO systems 100, 200 illustrated in FIGS. 1-2 and discussed previously. For example, the plurality of MIMO modules may comprise channel encoders, interleavers, serial-to-parallel converters, MIMO demodulators, de-interleavers, channel decoders, etc.

The plurality of MIMO modules (e.g., the first MIMO module 520 and the second MIMO module 522) may generally comprise various MIMO communication resources, which may be allocated for communicating information. In a non-limiting exemplary scenario, such allocated MIMO communication resources may communicate information with a plurality of transmitters (e.g., any of the first transmitter 540 through the $n^{th}$ transmitter 550), which in turn communicate signals with a plurality of corresponding antennas (e.g., the first antenna 560 through $n^{th}$ antenna 570).

The resource allocation module 510 may generally allocate various communication resources (e.g., MIMO communication resources) for various communications. Such allocation may comprise allocating resources directly or indirectly (e.g., by allocating bandwidth that is associated with particular resources). For example, the resource allocation module 510 may generally control allocation of the plurality of transmitters (e.g., the first transmitter 540 through the $n^{th}$ transmitter 550). Also for example, the resource allocation module 510 may generally control allocation of the plurality of antennas (e.g., the first antenna 560 through $n^{th}$ antenna 570). Further for example, the resource allocation module 510 may control allocation of various other modules or components (e.g., the first MIMO module(s) 520, the second MIMO module(s) 522 and the other communication module(s) 524).

In an exemplary operating scenario, the resource allocation module 510 may allocate frequency and time bandwidth for communication with a second communication system (i.e., at least a second communication system). The resource allocation module 510 may, for example and without limitation, share various functional characteristics with step 320 of the exemplary method 300 illustrated in FIG. 3 and discussed previously.

As discussed previously, frequency and time bandwidth may comprise various characteristics corresponding to various communication types or protocols. For example and without limitation, such communication types and protocols may comprise FDM, TDM, TDMA, CDMA, frequency hopping, and time interval hopping. Frequency and time bandwidth allocation may, for example and without limitation, comprise allocating time, frequency, code, frequency hopping sequence, time hopping sequence, and various combinations thereof. Accordingly, the scope of various aspects of the present invention should not be limited by characteristics of any particular manner of, or mechanism (e.g., including hardware and/or software) for, allocating frequency and time bandwidth.

The resource allocation module 510 may allocate frequency and time bandwidth (or frequency-time space) for communication with a second communication system in any of a variety of manners. For example and without limitation, the resource allocation module 510 may determine communication bandwidth needed for a communication and determine a particular frequency and time bandwidth that may (e.g., in combination with antenna multiplexing) provide an appropriate level of communication bandwidth for the communication.

The resource allocation module 510 may, for example, allocate frequency and time bandwidth for one or more communications by cross-listing a communication (or multiple communications) with frequency-time space in a data table. Also for example, the resource allocation module 510 may perform such allocating by utilizing various arrays or lists with allocation flags. Accordingly, the scope of various aspects of the present invention should not be limited by characteristics of any particular manner of, or mechanism for, allocating or managing frequency-time space.

The resource allocation module 510 may, for example, allocate a first portion of the plurality of transmitters (e.g., a first portion of the first through $n^{th}$ transmitters 540-550) for communication with the second communication system utilizing the allocated frequency and time bandwidth. The resource allocation module 510 may, for example and without limitation, share various functional characteristics with step 330 of the exemplary method 300 illustrated in FIG. 3 and discussed previously. The resource allocation module 510 may allocate the first portion of the plurality of transmitters in any of a variety of manners.

The resource allocation module 510 may, for example and without limitation, maintain a cross-list of transmitters to respective communications (e.g., in a memory of the communication system 500). Also for example, the resource allocation module 510 may maintain allocation flags, arrays and/or tables. The resource allocation module 510 may also, for example, communicate or prepare communication support information (e.g., protocol information, secure communication information, MIMO training information, etc.). The resource allocation module 510 may also, for example, specify or control the routing of communication signals between various communication support modules (e.g., the first MIMO module(s) 520, second MIMO module(s) 522, other communication module(s) 524, or portions thereof) and transmitters (e.g., any or all of the first transmitter 540 through $n^{th}$ transmitter 550) of the communication system 500. Accordingly, the scope of various aspects of the present invention should not be limited by characteristics of any particular manner of, or mechanism for, allocating one or more transmitters or other communication resources for communicating with another communication system.

The resource allocation module 510 may also, for example, in various exemplary scenarios, determine the first portion of the plurality of transmitters (e.g., a first portion of the first through $n^{th}$ transmitters 540-550) to be allocated for communication with the second communication system. The resource allocation module 510 may perform such a determination in any of a variety of manners.

For example and without limitation, the resource allocation module 510 may determine the first portion of the plurality of transmitters based, at least in part, on communication quality. In a non-limiting exemplary scenario, the resource allocation module 510 may determine (e.g., analytically or empirically) communication quality associated with utilizing the plurality of transmitters to communicate with the second communication system. The resource allocation module 510 may then determine whether the quality corresponding to the first portion of the plurality of transmitters is appropriate for communicating with the second communication system. The resource allocation module 510 may, for example, make such a determination based, at least in part, on predetermined quality goals or quality goals that may be communicated with the second communication system.

Also for example, the resource allocation module 510 may determine the first portion of the plurality of transmitters based, at least in part, on energy or power considerations. In a non-limiting exemplary scenario, the resource allocation module 510 may determine (e.g., analytically or empirically) an amount of energy or power associated with utilizing the first portion of the plurality of transmitters for communicating with the second communication system. The resource allocation module 510 may, for example, determine energy or power associated with transmission power and/or signal processing. The resource allocation module 510 may also, for example, determine energy associated with the communication system 500 and/or the second communication system. Additionally, the resource allocation module 510 may, for example, determine energy or power availability for the communication system 500 and/or the second communication system (e.g., relatively limited battery energy or power and/or relatively unlimited electric utility energy or power).

After determining information of one or more energy or power considerations, the resource allocation module 510 may then determine whether the energy or power associated with utilizing the first portion of the plurality of transmitters is appropriate for communicating with the second communication system. In a first non-limiting exemplary scenario, the resource allocation module 510 may determine that the energy or power associated with utilizing the first portion of the plurality of transmitters is appropriate. In a second non-limiting exemplary scenario, the resource allocation module 510 may determine that the energy or power associated with utilizing the first portion of the plurality of transmitters is too high and that a different portion of the plurality of transmitters should be utilized.

The resource allocation module 510 may also, for example, determine the first portion of the plurality of transmitters based, at least in part, on physical location of the second communication system. The resource allocation module 510 may, for example, determine the physical location of the second communication system by utilizing any of a variety of techniques (e.g., GPS or system triangulation) or by receiving information of such location from the second communication system.

Once such physical location of the second communication system has been determined, the resource allocation module 510 may determine the first portion of the plurality of transmitters based, at least in part, on such physical location. For example and without limitation, the resource allocation module 510 may compare the physical location to a predetermined map (e.g., stored in a memory of the communication system 500 or a memory communicatively coupled thereto) that cross-lists physical locations to respective sets or numbers of transmitters.

The resource allocation module 510 may also, for example, determine the first portion of the plurality of transmitters based, at least in part, on multi-path characteristics of the present communication environment. For example, the resource allocation module 510 may determine multipath characteristics between the communication system 500 and the second communication system analytically or empirically. In a first non-limiting exemplary scenario, the resource allocation module 510 may determine multipath characteristics by comparing a determined physical location of the second communication system with a map of multipath characteristics. In a second non-limiting exemplary scenario, the resource allocation module 510 may communicate a test signal with the second communication system (e.g., utilizing the first portion of the plurality of transmitters or other transmitters) and measure multipath characteristics.

Once multipath characteristics have been determined, the resource allocation module 510 may determine the first portion of the plurality of transmitters based, at least in part, on such multi-path characteristics. For example, in a first non-limiting exemplary scenario, the resource allocation module 510 may determine that the multipath characteristics correspond to relatively efficient utilization of a relatively high number of the plurality of transmitters for communication with the second communication system. Also for example, in a second non-limiting exemplary scenario, the resource allocation module 510 may determine that the multipath characteristics correspond to relatively efficient utilization of a single or low number of the plurality of transmitters for communication with the second communication system.

The resource allocation module 510 may further, for example, determine the first portion of the plurality of transmitters based, at least in part, on information obtained from the second communication system. Such information may comprise characteristics of any of a variety of information. As mentioned previously, such information may comprise information of quality goals and/or location information. Also, for example, such information may comprise information of communication capabilities of the second communication system (e.g., total number or functional number of transceivers, MIMO or MISO communication capability, etc.).

The resource allocation module 510 may obtain such information from the second communication system in real-time as needed or prior to the need for such information. For example, the resource allocation module 510 may process information previously obtained from the second communication system and stored in a memory. Alternatively, the resource allocation module 510 may communicate with the second communication system (utilizing one or more of the first transmitter 540 through $n^{th}$ transmitter 550) to obtain information from the second communication system, as such information is needed. Once such information has been obtained from the second communication system, the resource allocation module 510 may determine the first portion of the plurality of transmitters based, at least in part, on such information.

The resource allocation module 510 may still further, for example, determine the first portion of the plurality of transmitters based, at least in part, on user command. The resource allocation module 510 may make such a determination in any of a variety of manners. For example and without limitation, the resource allocation module 510 may communicate (e.g., through a user interface of the communication system 500) with a user of the communication system 500 to receive a user command regarding a number of the plurality of transmitters or a particular set of the plurality of transmitters to utilize. Similarly for example, the resource allocation module 510 may communicate with a user of the second communication system. Note that such a user command may directly specify the first portion of the plurality of transmitters or may specify other related aspects of communication system 500 operation that are related to the plurality of transmitters (e.g., communication quality or energy-related user commands).

The resource allocation module 510 may also, for example, determine the first portion of the plurality of transmitters based, at least in part, on a predetermined first portion. Such a predetermined first portion may, for example, be mandated or may represent a default first portion to utilize. Such a predetermined first portion may, for example, be associated with a particular communication system, second communication system, group of communication systems, etc. Such a predetermined first portion may, for example, be based on prior communications with the second communication system or other communication system(s).

The resource allocation module 510 may further, for example, determine the first portion of the plurality of transmitters based, at least in part, on system or communication priority. In a first non-limiting exemplary scenario, the resource allocation module 510 may determine to allocate up to a relatively high number of the plurality of transmitters for communication with a relatively high-priority second communication system (e.g., associated with a relatively high-cost communication plan or associated with an emergency communication). In a second non-limiting exemplary scenario, the resource allocation module 510 may determine to allocate only a relatively low number of the plurality of transmitters for communication with a relatively low-priority second communication system (e.g., associated with a relatively low-cost communication plan).

The resource allocation module 510 may additionally, for example, determine the first portion of the plurality of transmitters based, at least in part, on time information (e.g., time-of-day, day-of-week, date, type-of-day, etc.). In a first non-limiting exemplary scenario, the resource allocation module 510 may determine to allocate a relatively small first portion of the plurality of transmitters during particular hours of the day and to allocate a relatively large first portion of the plurality of transmitters during other particular hours of the day. In a second non-limiting exemplary scenario, the resource allocation module 510 may determine to allocate one portion of the plurality of transmitters during the workweek and another portion of the plurality of transmitters on the weekend (or on holidays).

In general, the resource allocation module 510 may allocate a first portion of the plurality of transmitters (e.g., a first portion of the first through $n^{th}$ transmitters 540-550) for communication with the second communication system utilizing the allocated frequency and time bandwidth. Accordingly, the scope of various aspects of the present invention should not be limited by characteristics of any particular manner of performing such allocation or any particular manner of, or mechanism for, determining such a first portion of the plurality of transmitters.

The resource allocation module 510 may, for example, also allocate a second portion of the plurality of transmitters (e.g., a second portion of the first through $n^{th}$ transmitters 540-550) for a purpose other than utilizing the allocated frequency and time bandwidth (e.g., as previously allocated for communication with the second communication system) to communicate with the second communication system. The resource allocation module 510 may, for example and without limitation, share various functional characteristics with step 340 of the exemplary method 300 illustrated in FIG. 3 and discussed previously. The resource allocation module 510 may, for example and without limitation, perform such an allocation in a manner similar to that discussed previously with regard to the first portion of the plurality of transmitters.

The resource allocation module 510 may allocate a second portion of the plurality of transmitters in any of a variety of manners. In a first non-limiting exemplary scenario, the resource allocation module 510 may block the second portion of the plurality of transmitters from utilizing the allocated frequency and time bandwidth to communicate with any communication system.

In a second non-limiting exemplary scenario, the resource allocation module 510 may allocate the second portion of the plurality of transceivers for communication with a third communication system utilizing the allocated frequency and time bandwidth. In such an exemplary scenario, the resource allocation module 510 may also determine the second portion of the plurality of transmitters (e.g., in any manner discussed previously with regard to the first portion of the plurality of transmitters). For example and without limitation, in such an exemplary scenario, the second communication system and the third communication system may each comprise a number of receivers not less than the combined number of the first portion of the plurality of transmitters and the second portion of the plurality of transmitters.

As discussed previously, the resource allocation module 510 may maintain a cross-list of transmitters (or corresponding communication resources) to respective communications. Also for example, the resource allocation module 510 may maintain allocation flags, arrays and/or tables. In scenarios where the communication system 500 may utilize the second portion of the plurality of transmitters to communicate with a third communication system, the resource allocation module 510 may also, for example, communicate or prepare communication support information (e.g., protocol information, secure communication information, MIMO training information, etc.). In such scenarios, the resource allocation module 510 may also, for example, specify or control the routing of communication signals between various communication support modules and transmitters of the communication system 500.

In general, the resource allocation module 510 may allocate a second portion of the plurality of transmitters for a purpose other than utilizing the frequency and time bandwidth allocated for communication with the second communication system to communicate with the second communication system. Accordingly, the scope of various aspects of the present invention should not be limited by characteristics of any particular manner of, or mechanism (e.g., hardware and/or software) for, blocking or allocating one or more transmitters for communicating with another communication system.

The exemplary communication system 500, or portions thereof, may perform any of a variety of additional processing. For example and without limitation, communication system 500 may communicate with the second communication system utilizing the first portion of the plurality of transmitters and the frequency-time space allocated for such communication by the resource allocation module 510. Also for example, the communication system 500 may, in various exemplary scenarios, communicate with a third communication system utilizing the second portion of the plurality of transmitters and the frequency-time space, as may have been allocated by the resource allocation module 510. Additionally for example, the communication system 500 may communicate with additional communication systems (e.g., utilizing unallocated transmitters) utilizing the frequency and time space previously allocated by the resource allocation module 510 for communication with the second communication system.

The exemplary communication system 500 may also, for example and without limitation, perform user interface functions (e.g., utilizing a user interface module). The communication system 500 may additionally, for example, monitor communication quality and/or communication conditions associated with communications (e.g., utilizing a communication condition monitor). The communication system 500 may further, for example, wait for additional communication to be requested. Also for example, the communication system 500 may re-determine transmitter allocation (e.g., to communicate additional communications, or portions thereof, or in response to detected communication conditions). Accordingly, the scope of various aspects of the present invention should not be limited by particular types of additional processing that may be performed by the communication system 500.

As mentioned previously, various aspects of the exemplary system 500 were previously presented by generally discussing transmitter allocation. However, various aspects of the present invention are readily extensible to receiver, transceiver or antenna allocation. Also for example, various aspects of the present invention are readily extensible to the allocation of various signal processing components (e.g., encoders/decoders, mappers, interleavers, etc.), hardware and/or software, of a communication system that generally correspond to communication utilizing multiple antennas. Accordingly, the scope of various aspects of the present invention should not be limited to allocation of transmitters.

Further understanding of various aspects of the present invention may be understood through consideration of an additional non-limiting exemplary scenario. For example and without limitation, the communication system 500, or components thereof, may share various functional aspects with the exemplary method 400 illustrated in FIG. 4 and discussed previously.

In the non-limiting exemplary scenario, the communication system 500 (e.g., the resource allocation module 510) may allocate communication resources (e.g., a plurality of antenna resources) for communication with a second communication system and a third communication system.

The exemplary scenario generally discusses allocation of antenna resources for illustrative purposes only. The plurality of antennas may, for example, communicate signals to a generally similar area (e.g., a same communication cell or general coverage area). However, the scope of various aspects of the present invention should not be limited by characteristics of antenna allocation. For example and without limitation, various aspects of the present invention are readily extensible to the allocation of antennas, transceivers, transmitters, receivers, and various signal processing modules associated with communication.

In the non-limiting exemplary scenario, the resource allocation module 510 may, for example, determine antenna diversity characteristics of the second and third communication systems. For example and without limitation, the resource allocation module 510 may share various functional characteristics with step 420 of the exemplary method 400 illustrated in FIG. 4 and discussed previously.

For example, the resource allocation module 510 may comprise determining the respective number of antennas of the second and third communication systems. Also for example, the resource allocation module 510 may determine respective capabilities (e.g., MIMO or MISO communication capabilities) of the second and third communication systems to utilize their respective antennas for communication.

The resource allocation module 510 may determine antenna diversity characteristics of the second and third communication systems in any of a variety of manners. For example and without limitation, the resource allocation module 510 may determine such characteristics by accessing information stored in a memory (e.g., a memory of the communication system 500 or a memory communicatively coupled to the communication system 500). Also, for example, the resource allocation module 510 may determine such characteristics by utilizing one or more of the first transmitter 540 through $n^{th}$ transmitter 550 to communicate with the second and third communication systems (or other systems) regarding the antenna diversity characteristics. Further for example, the resource allocation module 510 may determine such characteristics by utilizing a user interface module to communicate with one or more users of the various communication systems.

In general, the resource allocation module 510 may determine antenna diversity characteristics of the second and third communication systems. Accordingly, the scope of various aspects of the present invention should not be limited by characteristics of any particular antenna diversity characteristics or of any particular manner of, or mechanism (e.g., hardware and/or software) for, determining such characteristics.

Continuing the non-limiting exemplary scenario, the resource allocation module 510 may, for example, determine communication needs (or goals) of the second and third communication systems. For example and without limitation, the resource allocation module 510 may share various functional characteristics with step 430 of the exemplary method 400 illustrated in FIG. 4 and discussed previously.

The communication needs may comprise characteristics of any of a variety of communication needs. For example and without limitation, such communication needs may comprise communication quality needs (e.g., quality targets, minimum acceptable quality needs, minimum data throughput requirements, error rate goals, etc.). Also for example, such communication needs may comprise communication energy or power needs (e.g., energy consumption goals, power utilization goals, maximum acceptable energy or power utilization, energy utilization statistics, amount of available energy or power, etc.).

The resource allocation module 510 may determine the communication needs of the second and third communication systems in any of a variety of manners. For example and without limitation, the resource allocation module 510 may determine the respective communication needs of the second and third communication systems by communicating with the second and third communication systems, or users thereof (e.g., utilizing one or more of the first transmitter 540 through $n^{th}$ transmitter 550). Also for example, the resource allocation module 510 may determine the respective communication needs of the second and third communication systems by accessing information stored in a memory (e.g., a memory of the communication system 500 or a memory communicatively coupled thereto). Further for example, the resource allocation module 510 may utilize a user interface module to communicate with one or more users to determine communication quality needs. Still further for example, the resource allocation module 510 may determine default communication quality needs.

In general, the resource allocation module 510 may determine communication needs of the second and third communication systems. Accordingly, the scope of various aspects of the present invention should not be limited by characteristics of any particular communication need or of any particular manner of, or mechanism for, determining such communication needs.

Continuing the exemplary scenario, the resource allocation module 510 may, for example, analyze the antenna diversity characteristics (e.g., as determined above) and the communication needs (e.g., as determined above) to determine if frequency and time bandwidth may be shared for communication with the second and third communication systems. The resource allocation module 510 may, for example and without limitation, share various functional characteristics with step 440 of the exemplary method 400 illustrated in FIG. 4 and discussed previously.

The resource allocation module 510 may perform such an analysis and make such a determination in any of a variety of manners. For example and without limitation, the resource allocation module 510 may determine whether various antenna allocations of the communication system 500 (e.g., compatible with the determined antenna diversity characteristics of the second and third communication systems), while utilizing the same frequency and time bandwidth, may provide communication with the second and third communication systems at acceptable quality levels. In a non-limiting example, the resource allocation module 510 may analytically or empirically determine a communication quality associated with a particular allocation of antennas (e.g., a particular allocation of the first through $n^{th}$ antennas 560-570) for communicating with the second communication system, and determine a communication quality associated with a particular allocation of antennas for communicating with the third communication system. The resource allocation module 510 may then, for example, compare such determined qualities to communication quality goals (e.g., as determined above) to determine whether the particular allocations of antennas would provide communication meeting desired quality goals. The resource allocation module 510 may, for example, perform such analysis for a variety of potential antenna allocations.

Also for example, the resource allocation module 510 may determine whether various antenna allocations of the communication system 500 (e.g., compatible with the determined antenna diversity characteristics of the second and third communication systems), while utilizing the same frequency and time bandwidth, may provide communication with the second and third communication systems with acceptable energy or power utilization. In a non-limiting example, the resource allocation module 510 may analytically or empirically determine energy or power utilization associated with a particular allocation of antennas (e.g., a particular allocation of the first antenna 560 through $n^{th}$ antenna 570) for communication with the second communication system, and determine energy or power utilization associated with a particular allocation of antennas for communication with the third communication system. The resource allocation module 510 may then, for example, compare such determined energy or power utilizations to communication energy or power goals (e.g., as determined above) to determine whether the particular allocations of antennas would provide communication with acceptable energy or power utilization. The resource allocation module 510 may, for example, perform such analysis for a variety of potential antenna allocations.

In general, the resource allocation module 510 may analyze the antenna diversity characteristics (e.g., as determined above) and the communication needs (e.g., as determined above) to determine if frequency and time bandwidth may be shared for communication with the second and third communication systems. Accordingly, the scope of various aspects of the present invention should not be limited by aspects of any particular antenna diversity characteristics, allocations, or communication needs of various communication systems.

Continuing the exemplary scenario, if the resource allocation module 510 determines that frequency and time bandwidth may be shared for communication with the second and third communication systems, then the resource allocation module 510 may perform such allocation. The resource allocation module 510 may, for example and without limitation, share various functional characteristics with step 460 of the exemplary method 400 illustrated in FIG. 4 and discussed previously.

The resource allocation module 510 may, for example, allocate overlapping frequency and time bandwidth for communications with the second and third communication systems. For example, frequency and time bandwidth may comprise characteristics corresponding to various communication types or protocols (e.g., FDM, TDM, TDMA, CDMA, frequency hopping sequencing, time interval hopping, etc.).

Also for example, the resource allocation module 510 may determine communication bandwidth needed for communications with the second and third communication systems and determine a particular frequency and time bandwidth that may (e.g., in combination with antenna multiplexing) provide an appropriate level of communication bandwidth for the communication.

The resource allocation module 510 may, for example, allocate frequency and time bandwidth for communication by cross-listing a communication (or multiple communications) with frequency-time space in a data table (e.g., stored in a memory of the communication system 500). Also for example, the resource allocation module 510 may perform such allocating by utilizing various arrays or lists with allocation flags. Accordingly, the scope of various aspects of the present invention should not be limited by characteristics of any particular manner of, or mechanism for, allocating or managing frequency-time space.

Continuing the exemplary scenario, the resource allocation module 510 may allocate a first antenna diversity space for communication with the second communication system. The resource allocation module 510 may, for example and without limitation, share various functional characteristics with step 470 of the exemplary method 400 illustrated in FIG. 4 and discussed previously.

Such a first antenna diversity space may, for example, comprise a first portion of the plurality of antennas (e.g., a first portion of the first antenna 560 through $n^{th}$ antenna 570) of the communication system 500. Such a first antenna diversity space may, for example, comprise a first portion of various transmitters, receivers, transceivers, signal processing modules and other components corresponding to a first portion of the plurality of antennas of the communication system 500.

As discussed previously, the resource allocation module 510 may perform resource allocation in any of a variety of manners. The resource allocation module 510 may, for example and without limitation, maintain a cross-list of various antenna diversity components (e.g., transmitters, receivers, transceivers, antennas, codecs, mappers, etc.) to respective communications. Also for example, the resource allocation module 510 may maintain allocation flags, arrays and/or tables. The resource allocation module 510 may also, for example, communicate (e.g., utilizing one or more of the first transmitter 540 through $n^{th}$ transmitter 550) or prepare communication support information (e.g., protocol information, secure communication information, MIMO training information, etc.) associated with communicating utilizing allocated antenna diversity space. The resource allocation module 510 may also, for example, specify or control the routing of communication signals between various communication support modules (e.g., the first and second MIMO module(s) 520, 522 and other communication module(s) 524) and transmitters (e.g., first transmitter 540 through $n^{th}$ transmitter 550) of the communication system 500. Accordingly, the scope of various aspects of the present invention should not be limited by characteristics of any particular manner of, or mechanism for, allocating antenna diversity space (or various components associated therewith) for communicating with other communication systems.

The resource allocation module 510 may also, for example, determine the first antenna diversity space and/or components associated therewith. The resource allocation module 510 may perform such determination in any of a variety of manners, exemplary illustrations of which were provided previously in the discussion regarding step 330 of the exemplary method 300 illustrated in FIG. 3. For example and without limitation, the resource allocation module 510 may determine the first antenna diversity space and/or components associated therewith based, at least in part, on any of communication quality, various energy considerations, various power considerations, communication system location(s), multipath characteristics, various information obtained from the second and third communication systems, various information stored in memory of the communication system, user command, predetermined antenna diversity space, system priority, time information, etc.

Note that in allocating the first antenna diversity space for communication with the second communication system (e.g., in determining the characteristics of the first antenna diversity space or associated system components) the resource allocation module 510 may, of course, perform such allocations in light of the antenna diversity characteristics and the communication needs determined previously. For example, the resource allocation module 510 may determine the first antenna diversity space to correspond to the antenna diversity characteristics and communication needs of the second communication system (e.g., as determined above).

In general, the resource allocation module 510 may allocate a first antenna diversity space for communication with the second communication system. Accordingly, the scope of various aspects of the present invention should not be limited by characteristics of any particular manner of, or mechanism for, performing such allocation or any particular manner of, or mechanism for, determining such a first antenna diversity space or associated components.

Continuing the non-limiting exemplary scenario, the resource allocation module 510 may, for example, allocate a second antenna diversity space for communication with the third communication system. The resource allocation module 510 may, for example and without limitation, share various functional characteristics with step 480 of the exemplary method 400 illustrated in FIG. 4 and discussed previously.

Such a second antenna diversity space may, for example, comprise a second portion of the plurality of antennas (e.g., a second portion of the first antenna 560 through n$^{th}$ antenna 570) of the communication system 500. Such a second antenna diversity space may, for example, comprise a second portion of various transmitters (e.g., a second portion of the first transmitter 540 through n$^{th}$ transmitter 550), receivers, transceivers, signal processing modules (e.g., a second portion of the first and second MIMO module(s) 520, 522 and the other communication module(s) 524), and other components corresponding to a second portion of the plurality of antennas of the communication system 500.

In general, the resource allocation module 510 may allocate a second antenna diversity space for communication with the second communication system. Accordingly, the scope of various aspects of the present invention should not be limited by characteristics of any particular manner of, or mechanism for, performing such allocation or any particular manner of, or mechanism for, determining such a second antenna diversity space or associated components.

The exemplary communication system 500 may, for example, perform any of a variety of additional processing. The communication system 500 may, for example and without limitation, share various functional characteristics with step 490 of the exemplary method 400 illustrated in FIG. 4 and discussed previously.

Such additional processing might comprise characteristics of any of a large variety of additional processing. For example and without limitation, the exemplary communication system 500 may communicate with the second and third communication systems utilizing the first and second allocated antenna diversity spaces allocated by the resource allocation module 510. Additionally for example, the exemplary communication system 500 may communicate with additional communication systems (e.g., utilizing antenna diversity space not yet allocated by the resource allocation module 510) utilizing the frequency and time space previously allocated by the resource allocation module 510.

The exemplary communication system 500 may also, for example and without limitation, perform user interface functions. The exemplary communication system 500 may additionally, for example, monitor communication quality and/or communication conditions associated with the second and third communication systems. The exemplary communication system 500 may further, for example, waiting for additional communication to be requested. Also for example, the exemplary communication system 500 may re-determine diversity characteristics, communication needs, frequency-time space allocation and/or antenna diversity allocation (e.g., to communicate additional communications, or portions thereof, or in response to detected communication conditions). Accordingly, the scope of various aspects of the present invention should not be limited by particular types of continued processing that may be performed by a system implementing the exemplary communication system 500.

The previous non-limiting exemplary scenario was provided to show specific examples of generally broader aspects of the present invention. Accordingly, the scope of various aspects of the present invention should not be limited by specific characteristics of the non-limiting exemplary scenario. For example, the non-limiting exemplary scenario generally concerned antenna diversity space allocation. Various aspects of the present invention may, for example, comprise transmitter, receiver, transceiver or antenna allocation. Also for example, various aspects of the present invention may comprise allocation of various signal processing components (e.g., encoders/decoders, mappers, interleavers, etc.), hardware and/or software, of a communication system that generally correspond to communication utilizing multiple antennas and antenna diversity space.

The exemplary communication system 500 was presented to provide specific illustrations of generally broader aspects of the present invention. Accordingly, the scope of various aspects of the present invention should not be limited by specific characteristics of the exemplary communication system 500.

The exemplary system 500, and modules thereof, may be implemented in hardware, software or a combination thereof. Also, various modules may share various hardware and/or software sub-modules. As a non-limiting example, a first module and a second module may share processing hardware or may share various software code segments. Accordingly, the scope of various aspects of the present invention should not be limited by any particular hardware or software implementation of the exemplary system 500 (or portions thereof) or by any arbitrary notion of boundaries between modules.

In addition, the exemplary system 500 may be implemented in any of a variety of degrees of integration. For example, the entire system 500 may be implemented on a single integrated circuit. Also for example, the entire system 500, except for the antennas, may be integrated on a single integrated circuit. Further for example, the exemplary system 500 may be implemented on a plurality of integrated circuits. Accordingly, the scope of various aspects of the present invention should not be limited by characteristics of a particular degree of integration or distribution.

In summary, various aspects of the present invention provide a system and method for allocating communication resources in a multi-transceiver configuration. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:
   allocating communication resources for communication, by:
   at resource allocation circuitry within a first communication system comprising a plurality of transmitters:
   allocating frequency and time bandwidth for communication with a second communication system;
   obtaining time information, the time information different than the allocated time bandwidth;
   receiving a location indication for the second communication system;
   determining a multipath characteristic applicable to the second communication system based on the location indication for the second communication system compared to a mapping of multipath characteristics to physical location;
   responsive to the multipath characteristic and the time information, determining a first portion of the plurality of transmitters for communication with the second communication system; and
   allocating the first portion of the plurality of transmitters for communication with the second communication system utilizing the allocated frequency and time bandwidth.

2. The method of claim 1, wherein the allocating of the frequency and the time bandwidth comprises allocating a code division multiple access code.

3. The method of claim 1, wherein the allocating of the frequency and the time bandwidth comprises allocating a time division multiple access frequency and timeslot.

4. The method of claim 1, wherein the determining of the first portion of the plurality of transmitters comprises determining the first portion of the plurality of transmitters based further on communication quality goals of the second communication system.

5. The method of claim 1, wherein the determining of the first portion of the plurality of transmitters comprises determining the first portion of the plurality of transmitters based further on communication capabilities of the second communication system.

6. The method of claim 5, wherein the communication capabilities of the second communication system comprise a total number of transceivers utilized by the second communication system.

7. The method of claim 1, wherein the determining of the first portion of the plurality of transmitters comprises determining the first portion of the plurality of transmitters based further on a present multipath environment.

8. The method of claim 1, wherein the determining of the first portion of the plurality of transmitters comprises determining the first portion of the plurality of transmitters based further on a command regarding transmitter allocation.

9. The method of claim 1, wherein the determining of the first portion of the plurality of transmitters comprises determining the first portion of the plurality of transmitters based further on antenna diversity characteristics of the second communication system.

10. The method of claim 1, wherein the determining of the first portion of the plurality of transmitters comprises determining the first portion of the plurality of transmitters based further on communication parameters of the second communication system.

11. A system, comprising:
a plurality of transmitters; and
resource allocation circuitry configured to:
 allocate frequency and time bandwidth for performing a communication over a wireless channel to a receiving system;
 receive a location indication for the receiving system;
 obtain time information, the time information different than the allocated time bandwidth;
 determining a multipath characteristic applicable to the receiving system based on the location indication compared to a mapping of mutipath characteristics to physical location;
 responsive to the multipath characteristic and the lime information, determine a first potion of the plurality of transmitters to perform the communication; and
 allocate the first portion of the plurality of transmitters to perform the communication using the frequency and time bandwidth allocated by the resource allocation circuitry.

12. The system of claim 11, wherein the resource allocation circuitry is configured to allocate the frequency and the time bandwidth by allocating a code division multiple access code.

13. The system of claim 11, wherein the resource allocation circuitry is configured to allocate the frequency and the time bandwidth by allocating a time division multiple access frequency and timeslot.

14. The system of claim 11, wherein the resource allocation circuitry is configured to determine the first portion of the plurality of transmitters based on communication quality goals of the receiving system.

15. The system of claim 11, wherein the resource allocation circuitry is configured to determine the first portion of the plurality of transmitters based on communication capabilities of the receiving system.

16. The system of claim 15, wherein the communication capabilities of the receiving system comprise a total number of transceivers utilized by the receiving system.

17. The system of claim 11, wherein the resource allocation circuitry is configured to determine the first portion of the plurality of transmitters based on a present multipath environment.

18. The system of claim 11, wherein the resource allocation circuitry is configured to determine the first portion of the plurality of transmitters based on a command regarding transmitter allocation.

19. The system of claim 11, wherein the resource allocation circuitry is configured to determine the first portion of the plurality of transmitters based on antenna diversity characteristics of the receiving system.

20. The system of claim 11, wherein the resource allocation circuitry is configured to determine the first portion of the plurality of transmitters based on communication parameters of the receiving system.

21. A product comprising:
a computer readable medium other than a transitory signal; and
instructions stored on the medium, the instructions configured to, when executed:
 at a first communication system comprising a plurality of transmitters, allocate frequency and time bandwidth for communication with a second communication system;
 obtain time information, the time information different than the allocated time bandwidth;
 receive a location indication for the second communication system;
 determine a multipath characteristic applicable to the second communication system based on the location indication compared to a mapping of multipath characteristics to physical location;
 responsive to the multipath characteristic and the time information, determine a first portion of the plurality of transmitters to communicate with the second communication system based on information obtained from the second communication system; and
 allocate the first portion of the plurality of transmitters for communication with the second communication system utilizing the allocated frequency and time bandwidth.

22. The product of claim 21, where the instructions are configured to determine first portion of the plurality of transmitters based on communication parameters of the second communication system.

23. The product of claim 21, wherein the instructions are configured to triangulate a location of the second communication system responsive to the location indication.

24. The method of claim 1, wherein the location indication comprises satellite positioning system coordinates.

25. The system of claim 11, wherein the location indication comprises information derived from a satellite-based navigation system.

26. The method of claim 1, wherein the time information includes time of day, day of week, date, type of day, or any combination thereof.

27. The system of claim 11, wherein time information comprises time of day, day of week, date, type of day, or any combination thereof.

28. The product of claim 21, wherein the time information comprises time of day, day of week, date, type of day, or any combination thereof.

* * * * *

UNITED STATES PATENT AND TRADEMARK OFFICE
CERTIFICATE OF CORRECTION

| | | |
|---|---|---|
| PATENT NO. | : 8,867,479 B2 | Page 1 of 1 |
| APPLICATION NO. | : 13/275584 | |
| DATED | : October 21, 2014 | |
| INVENTOR(S) | : Jeyhan Karaoguz et al. | |

It is certified that error appears in the above-identified patent and that said Letters Patent is hereby corrected as shown below:

In the Claims

In column 27, claim 11, line 52, after "to a mapping of" replace "mutipath" with --multipath--.

In column 27, claim 11, line 54, after "characteristic and the" replace "lime" with --time--.

Signed and Sealed this
Third Day of February, 2015

Michelle K. Lee
*Deputy Director of the United States Patent and Trademark Office*